United States Patent [11] 3,524,392

[72] Inventors Kurt Langnau
Dresden, Germany;
Walter Hennig, Dresden, Germany; Horst Strehle, Dresden, Germany; Heinz Schulze, Dresden, Germany
[21] Appl. No. 795,173
[22] Filed Jan. 30, 1969
Division of Ser. No. 534,074, Mar. 14, 1966, now Pat. No. 3,481,259, Dec. 2, 1969.
[45] Patented Aug. 18, 1970
[73] Assignee VEB Pentacon Dresden Kamera-und Kinowerke
Dresden, Germany

[54] PHOTOGRAPHIC CAMERA WITH ADJUSTABLE FILM SPEED CONTROL
2 Claims, 2 Drawing Figs.
[52] U.S. Cl. .................................................. 95/10, 95/31, 95/64, 352/78, 352/141, 356/226
[51] Int. Cl. .................................................. G01j 1/42, G03b 7/08
[50] Field of Search .......................................... 95/10C, 64D, 31, 31F5; 352/141, 72, 78; 356/226

[56] References Cited
UNITED STATES PATENTS
3,351,413 11/1967 Kono .......................... 95/10(C)X
3,410,186 11/1968 Kaneko ........................ 95/31X
3,421,421 1/1969 Hann et al. ................... 352/141X
FOREIGN PATENTS
737,159 7/1943 Germany ..................... 356/226

Primary Examiner—Norton Ansher
Assistant Examiner—Joseph F. Peters, Jr.
Attorney—Young and Thompson ABSTRACT: A camera having a built-in photo-electric exposure meter by which exposure of the film is controlled. An aperture diaphragm is automatically controllable by an adjusting device which is dependent on the reading of the exposure meter. There is provided a switchable resistor circuit enabling a required resistor to be selected so that a continuous closed circuit incorporating a resistor, said photo-electric cell and said adjusting means is formed. The value of resistor selected being dependent on the sensitivity of the film, said resistor being selectable either automatically by the insertion of a special film carrier having a contact bridge wherein the position of said contact bridge is arranged to connect the required resistor in circuit, or manually when a conventional film carrier is used, by rotation of the wiper of the switch to include the required resistor indicated by a film sensitivity scale.

INVENTORS
KURT LANGNAU
WALTER HENNIG
HORST STREHLE
HEINZ SCHULZE

By Young & Thompson
ATTYS.

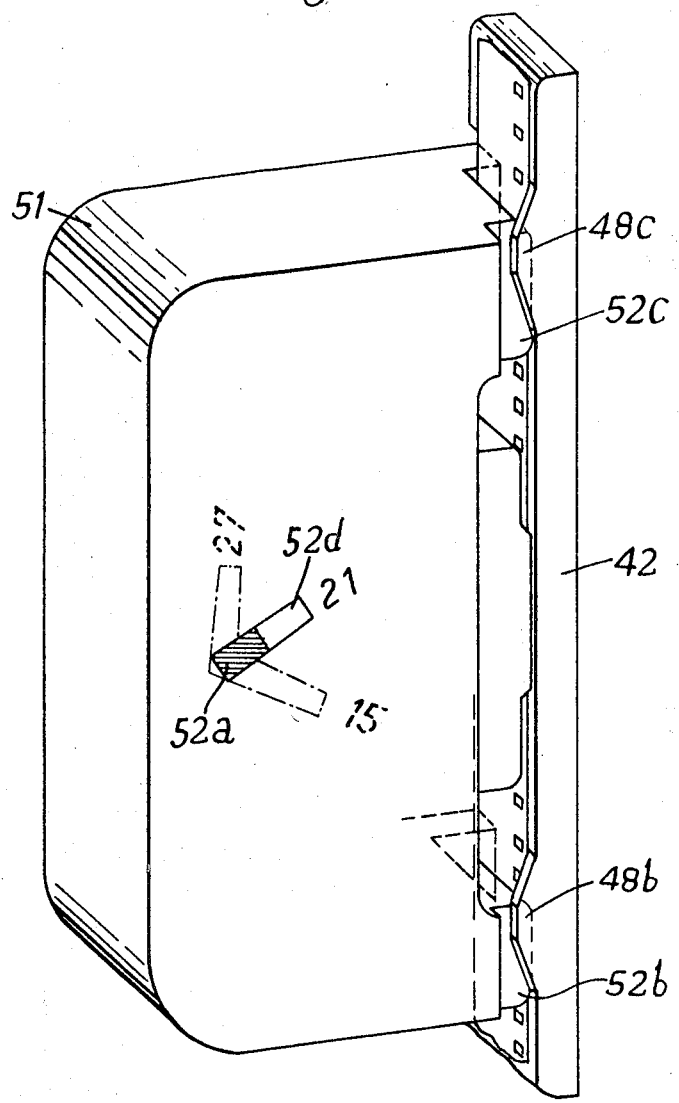

PHOTOGRAPHIC CAMERA WITH ADJUSTABLE FILM SPEED CONTROL

This application is a division of application Ser. No. 534,074, filed Mar. 14, 1966, now Pat. No. 3,481,259.

SUMMARY OF INVENTION

This invention relates to a photographic or cinematographic camera having a built in photo-electric exposure meter coupled with a device for automatically controlling an aperture diaphragm dependent on the level of the prevailing brightness measured by the exposure meter and also on the sensitivity of film in an insertable cassette. Some known cameras may have a setting abutment, the position of the setting abutment being determined according to the speed of the film so that insertion of the cassette in the camera results in the setting of an appropriate exposure factor.

Known cameras of this kind are subject to the drawback that they can only be used for cassettes or films of the type provided with lugs or recesses of the code system for which the camera device is designed. Cassettes or films available on the market and not provided with lugs or recesses in accordance with this code system, or lacking lugs and recesses altogether are therefore unusable with such cameras. There is of course a known type of cassette with an adjustable lug enabling the camera to be set for the film sensitivity in question, but in this case the use of a camera of the aforementioned kind necessitates recourse to a special cassette characterized by adjustable lugs.

An object of the invention is to provide a sensing device on the camera, enabling the film speed or exposure factors such as filter numbers dependent thereon to be set automatically or manually as desired.

SUMMARY OF THE INVENTION

In accordance with the invention there is provided a camera having a photo-electric exposure control device as well as an insertable film cassette removably received therein, said cassette having a contact bar for the bridging of a stop contact with a plurality of setting contacts alternatively which are provided on the camera side and which are connected on electrically conductive lines with resistances provided in the circuit of the exposure control device in order to take account of film speed factors; including an auxiliary contact in line with the setting contacts, the auxiliary contact being electrically connected to the stop contact, a manually movable contact member for the bridging of the stop contact with the auxiliary contact and one of the setting contacts alternatively according to whether automatic or manual setting of the film speed is changed and a film speed scale in relation to which the contact member is manually settable.

The details of the invention may be seen from the examples illustrated and described with reference to the accompanying drawings in which:

FIGURE 2 shows a cassette suitable for insertion into a camera having the arrangement shown in FIGURE 1, the cassette having a contact bridge which is positioned according to the speed of the film in the cassette.

Figure 1:
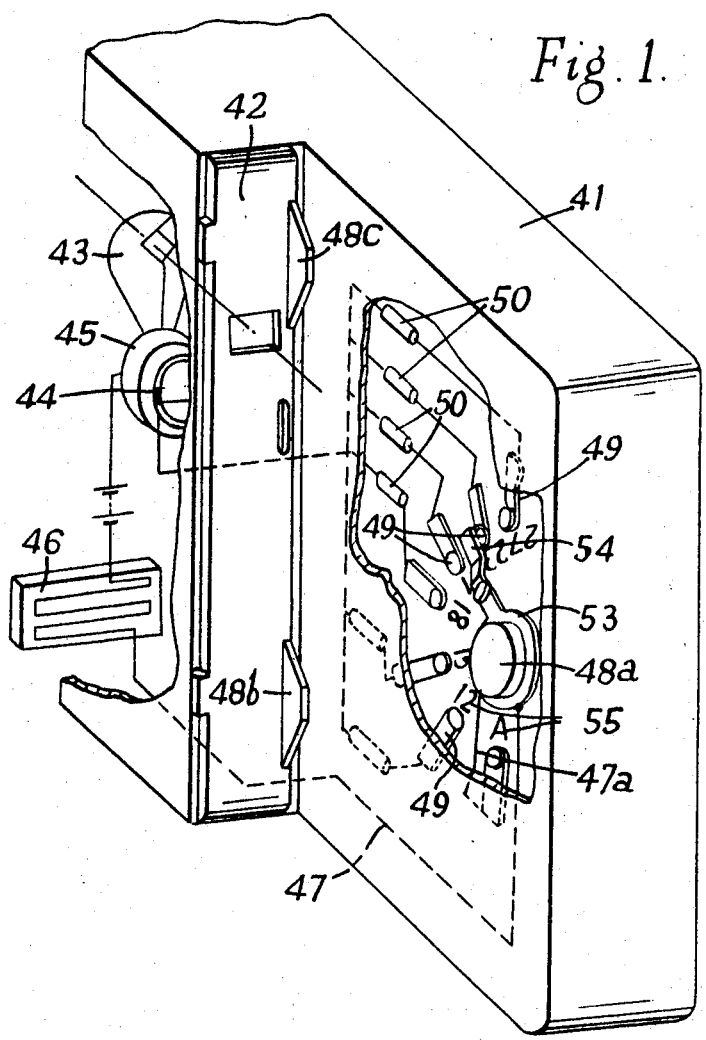
FIGURE 1 shows an exposure factor setting arrangement in a cinematographic camera capable of accommodating a cassette with or without a contact bridge in which film speed can be set electrically through a system of resistances enabling different film sensitivities to be taken into account.

The arrangement in FIGURE 1 shows the camera housing 41 of a cinematographic camera, only part of this housing being illustrated, an aperture diaphragm 43, which is coupled with the moving coil 44 of the measuring mechanism 45, is situated in front of the film track 42. On the front side of the housing 41, there is the photo-electric cell 46, of which the first pole is connected via a conductor 47 with a wiper 54 of a changeover switch 53. The wiper is rotatably mounted on a contact bolt 48a constructed as a support for a cassette 51 and is insulated from the bolt. To ensure a reliable three-point support for the cassette 51, two further supports 48b and 48c are provided on the camera. A series of spring-loaded contacts 49 are provided concentrically around the contact bolt 48a, each of them being connected via a resistance 50 and a moving coil 44 to the other pole of the photo-electric cell 46. The resistances 50 differ from one another in their magnitude and serve to enable different film sensitivities to be taken into account. The wiper 54 moves over the contact 49.

A scale 55 with values for different film sensitivities is associated with the contacts 49; the scale 55 terminates in a mark "A" for the automatic selection of the sensitivity. The cassette 51 (cf. FIGURE 5) is provided with stops 52a, 52b and 52c. The stop 52a is prolonged in the form of a contact bridge 52d which extends as far as the zone of the contacts 49 provided on the camera. The stop 52a with its contact bridge 52d, is situated in different positions in the cassette 51, in accordance with the speed of film inserted (e.g. 21°/10 DIN as shown).

If it is desired to operate with a cassette 51, shown in FIGURE 2, having a contact bridge 52d in accordance with the speed of film inserted, the wiper 54 is rotated as far as the contact 49 opposite the mark "A", thus establishing the electrical connection between the contact bolt 48a and the conductor 47 via a lead 47d. The cassette 51 has a contact bridge 52d in a certain reselected position in accordance with the speed of film inserted. When the cassette 51 is inserted in the housing 41 of the pick-up camera the stops 52a, 52b and 52c of the film cassette come to rest against the contact bolt 48a and the supports 48b and 48c of the housing 41, thus fixing the position of the cassette 51 in the housing 41. At the same time the stop 52a comes to rest, by its contact bridge 52d, on one of the spring loaded contacts 49, so that the measuring current circuit is closed, via one of the resistances 50. The exposure control system 43, 44 and 45, is thus adapted to the sensitivity of the speed of film inserted.

If a cassette is inserted which has no contact bridge, the system can be switched over to manual setting of the film speed. For this purpose the changeover switch 53 is rotated away from the contact 49 opposite the mark "A" to any other contact 49 which corresponds to the value of the speed of the film being used. In this position of the wiper 54 the electrical connection between the contact bolt 48a and the conductor 47 is broken. The manual adjustment is not nullified by any metal cassette which may be inserted.

The invention permits of numerous further variations. For example, the changeover switch for nullifying the automatic adjustment and the adjusting element for enabling different filter factors or film sensitivities to be taken into account by manual means can be provided separately from each other.

We claim:

1. In a camera having a photo-electric exposure control device as well as an insertable film cassette removably received therein, said cassette having a contact bar for the bridging of a stop contact with a plurality of setting contacts alternatively which are provided on the camera side and which are connected on electrically conductive lines with resistances provided in the circuit of the exposure control device in order to take account of film speed factors; the provision of (a) an auxiliary contact in line with the setting contacts, the auxiliary contact being electrically connected to the stop contact, (b) a manually movable contact member for the bridging of the stop contact with the auxiliary contact and one of the setting contacts alternatively according to whether automatic or manual setting of the film speed is changed and, (c) a film speed scale in relation to which the contact member is manually settable.

2. A camera according to Claim 1, including a plurality of setting contacts and an auxiliary contact arranged in an arc around the central stop contact, whereby the contact member for the bridging of the stop contact with the auxiliary contact and one the setting contacts alternatively is rotatably mounted at the central stop contact.